US010583933B2

(12) United States Patent
Elbibary et al.

(10) Patent No.: US 10,583,933 B2
(45) Date of Patent: Mar. 10, 2020

(54) METHOD AND APPARATUS FOR UNDERCOWL FLOW DIVERSION COOLING

(71) Applicant: GENERAL ELECTRIC COMPANY, Schenectady, NY (US)

(72) Inventors: Mohamed Elbibary, West Chester, OH (US); Clark George Wiberg, Liberty Township, OH (US); Brandon Christopher Clarke, Hebron, KY (US); Steven Edward Nolte, West Chester, OH (US)

(73) Assignee: General Electric Company, Schenectady, NY (US)

( * ) Notice: Subject to any disclaimer, the term of this patent is extended or adjusted under 35 U.S.C. 154(b) by 475 days.

(21) Appl. No.: 15/284,001

(22) Filed: Oct. 3, 2016

(65) Prior Publication Data

US 2018/0134407 A1 May 17, 2018

(51) Int. Cl.
*B64D 33/08* (2006.01)
*F02C 9/18* (2006.01)
*F02C 7/18* (2006.01)
*F02C 7/16* (2006.01)

(52) U.S. Cl.
CPC ............... *B64D 33/08* (2013.01); *F02C 7/16* (2013.01); *F02C 7/18* (2013.01); *F02C 9/18* (2013.01); *F05D 2260/20* (2013.01)

(58) Field of Classification Search
CPC ...... B64D 2033/0226; B64D 2033/024; B64D 2033/0286; B64D 27/16; B64D 33/08; F02C 7/18; F02C 7/12; F02C 7/16
See application file for complete search history.

(56) References Cited

U.S. PATENT DOCUMENTS

| | | | |
|---|---|---|---|
| 2,970,436 A | 2/1961 | Sims, Jr. | |
| 4,291,531 A | 9/1981 | Campbell | |
| 4,441,314 A * | 4/1984 | Fitton | F01D 11/24 244/129.2 |
| 4,452,037 A | 6/1984 | Waddington et al. | |
| 4,474,001 A | 10/1984 | Griffin et al. | |
| 4,546,605 A * | 10/1985 | Mortimer | F01D 17/105 184/6.11 |
| 4,653,267 A | 3/1987 | Brodell et al. | |

(Continued)

FOREIGN PATENT DOCUMENTS

EP 1884628 A2 2/2008

*Primary Examiner* — Steven M Sutherland
*Assistant Examiner* — Thuyhang N Nguyen
(74) *Attorney, Agent, or Firm* — Dority & Manning, P.A.

(57) ABSTRACT

A cooling system includes a first conduit positioned within a cavity and extends from a radially inner casing aperture to a radially outer casing aperture. The cooling system also includes a second conduit coupled in flow communication with the first conduit and extending into the cavity. The cooling system further includes at least one valve positioned within the first conduit and the second conduit. The at least one valve and the first conduit are configured to channel a first fluid from the radially inner casing aperture to the radially outer casing aperture during a first mode of operation. The at least one valve, the second conduit, and the first conduit are configured to channel a second fluid from the radially outer casing aperture to the cavity during a second mode of operation.

17 Claims, 4 Drawing Sheets

(56) References Cited

U.S. PATENT DOCUMENTS

| | | | |
|---|---|---|---|
| 4,849,895 A * | 7/1989 | Kervistin | F01D 11/24 |
| | | | 701/100 |
| 5,012,639 A | 5/1991 | Ream et al. | |
| 5,123,242 A | 6/1992 | Miller | |
| 5,126,392 A | 6/1992 | Nakashima et al. | |
| 5,261,228 A * | 11/1993 | Shuba | F01D 17/105 |
| | | | 60/226.3 |
| 5,385,012 A | 1/1995 | Rowe | |
| 5,439,353 A | 8/1995 | Cook et al. | |
| 5,965,240 A | 10/1999 | Blackburn et al. | |
| 6,132,857 A | 10/2000 | Champenois et al. | |
| 6,134,880 A | 10/2000 | Yoshinaka | |
| 6,141,951 A | 11/2000 | Krukoski et al. | |
| 6,202,403 B1 | 3/2001 | Laborie et al. | |
| 6,498,978 B2 | 12/2002 | Leamy et al. | |
| 6,575,699 B1 | 6/2003 | Jones | |
| 7,510,778 B2 | 3/2009 | Bernard et al. | |
| 7,744,346 B2 | 6/2010 | Schreiber et al. | |
| 7,766,610 B2 | 8/2010 | Busekros et al. | |
| 7,780,410 B2 | 8/2010 | Kray et al. | |
| 7,780,420 B1 | 8/2010 | Matheny | |
| 7,805,839 B2 | 10/2010 | Cammer | |
| 7,823,374 B2 | 11/2010 | Venkataramani et al. | |
| 7,845,159 B2 | 12/2010 | Venkataramani et al. | |
| 7,900,437 B2 | 3/2011 | Venkataramani et al. | |
| 8,015,788 B2 | 9/2011 | Stephenson et al. | |
| 8,137,073 B2 | 3/2012 | Giusti et al. | |
| 8,240,975 B1 | 8/2012 | Ryznic | |
| 8,395,275 B2 | 3/2013 | Blewett et al. | |
| 8,397,487 B2 | 3/2013 | Sennoun et al. | |
| 8,776,530 B2 | 7/2014 | Shirooni et al. | |
| 8,820,046 B2 | 9/2014 | Ross et al. | |
| 9,038,399 B2 | 5/2015 | MacFarlane | |
| 9,091,173 B2 | 7/2015 | Mosley et al. | |
| 9,121,309 B2 | 9/2015 | Geiger | |
| 2002/0173897 A1 | 11/2002 | Leamy et al. | |
| 2007/0031249 A1 | 2/2007 | Jones | |
| 2008/0253922 A1 | 10/2008 | Trimmer et al. | |
| 2009/0025365 A1 | 1/2009 | Schilling et al. | |
| 2009/0301053 A1 | 12/2009 | Geiger | |
| 2010/0329863 A1 | 12/2010 | Kray et al. | |
| 2011/0027096 A1 | 2/2011 | Northfield | |
| 2011/0049297 A1 | 3/2011 | Jevons et al. | |
| 2011/0182741 A1 | 7/2011 | Alexander | |
| 2011/0211967 A1 | 9/2011 | Deal et al. | |
| 2011/0229334 A1 | 9/2011 | Alexander | |
| 2011/0232294 A1 | 9/2011 | Ross et al. | |
| 2012/0003100 A1 | 1/2012 | James et al. | |
| 2012/0301292 A1 | 11/2012 | Deal et al. | |
| 2012/0316748 A1 | 12/2012 | Jegu et al. | |
| 2013/0091850 A1 | 4/2013 | Francisco | |
| 2014/0077116 A1 | 3/2014 | Santiago et al. | |
| 2014/0083106 A1 | 3/2014 | Mackin et al. | |
| 2014/0236451 A1 | 8/2014 | Gerez et al. | |
| 2014/0373553 A1 | 12/2014 | Zaccaria et al. | |
| 2015/0044022 A1 | 2/2015 | Bagni et al. | |
| 2015/0047359 A1 | 2/2015 | Maguire et al. | |
| 2015/0252792 A1 | 9/2015 | Niggemeier et al. | |

* cited by examiner

METHOD AND APPARATUS FOR UNDERCOWL FLOW DIVERSION COOLING

BACKGROUND

The field of the disclosure relates generally to gas turbine engines and, more particularly, to a method and apparatus for cooling an undercowl space in gas turbine engines.

Gas turbine engines typically include an undercowl space or engine core compartment as a part of the engine architecture. As gas turbine engine efficiency is improved, pressure ratios of fans and compressors, internal engine temperatures are expected to rise substantially, resulting in higher temperature for the engine core compartment and components. Engine core compartment components include electronics and other line replaceable units (LRUs). Such electronic components in known gas turbine engines, including full authority digital engine (or electronics) controls (FADECs), may be particularly sensitive to increasing engine core compartment temperatures both during gas turbine engine operation and during thermal soakback after engine shutdown. Although the electronics are not located in the hottest portion of the engine, such as those portions exposed directly to combustion products, heat from various hot portions of an operating gas turbine can be transferred to the location of the electronics, causing the temperature of the electronics to rise.

In addition to experiencing elevated temperatures during operation, the electronics may be exposed to even higher temperatures during the period after engine shut down. During this time period, the hot portions of the engine continue to radiate and conduct heat into the surrounding engine mass as they cool, but there is no airflow through the engine to help carry heat away from the rest of the engine. As a result, the temperature of some of the electronics may actually rise as the hottest engine portions cool down. Electronics temperatures can exceed 500° F. during this period of time typically referred to as "soakback."

Such temperatures can have undesirable effects on electrical and electronic components. For example, the components that make up electronics equipment can break down. While an abrupt catastrophic failure of an electronic component may not always occur, progressive breakdown due to elevated temperature and thermal cycling can reduce the usable lifetime of such electronic components.

Known systems with radiation shields add weight to gas turbine engines and, therefore, increase the SFC. Where such components are placed at remote locations in the engine, increases in the length of connecting cables also increases engine weight and tends to increase SFC while also complicating maintenance activities. Furthermore, in such known gas turbine engines, such problems are compounded during soakback when there is no cooling flow. An extended delay after operation of such known gas turbine engines before servicing them may be required.

BRIEF DESCRIPTION

In one aspect, a cooling system configured to cool a cavity within a rotatable machine is provided. The rotatable machine includes a radially inner casing wall and a radially outer casing wall defining a cavity. The radially inner casing wall defines a radially inner casing aperture and the radially outer casing wall defines a radially outer casing aperture. The rotatable machine also includes a cooling system which includes a first conduit positioned within the cavity and extending from the radially inner casing aperture to the radially outer casing aperture. The cooling system also includes a second conduit coupled in flow communication with the first conduit and extending into the cavity. The cooling system further includes at least one valve positioned within the first conduit and the second conduit. The at least one valve and the first conduit are configured to channel a first fluid from the radially inner casing aperture to the radially outer casing aperture during a first mode of operation. The at least one valve, the second conduit, and the first conduit are configured to channel a second fluid from the radially outer casing aperture to the cavity during a second mode of operation. The at least one valve, the second conduit, and the first conduit are configured to channel a third fluid from the cavity to the radially outer casing aperture during a third mode of operation.

In another aspect, a gas turbine engine is provided. The gas turbine engine includes a core engine including a compressor, a combustor, and a turbine in a serial flow arrangement. The gas turbine engine also includes a vertically upper portion and a vertically lower portion of the gas turbine engine opposite the vertically upper portion. The gas turbine engine further includes an inner casing circumscribing the core engine and an outer casing circumscribing the inner casing. The inner casing and the outer casing define a plurality of cavities. The inner casing defines a plurality of inner casing openings and the outer casing defines a plurality of outer casing openings. The gas turbine engine further includes at least one cooling system. The at least one cooling system including a first conduit positioned within the cavity and extending from the radially inner casing aperture to the radially outer casing aperture. The at least one cooling system also includes a second conduit coupled in flow communication with the first conduit and extending into the cavity. The at least one cooling system further includes at least one valve positioned within the first conduit and the second conduit. The at least one valve and the first conduit are configured to channel a first fluid from the radially inner casing aperture to the radially outer casing aperture during a first mode of operation. The at least one valve, the second conduit, and the first conduit are configured to channel a second fluid from the radially outer casing aperture to the cavity during a second mode of operation. The at least one valve, the second conduit, and the first conduit are configured to channel a third fluid from the cavity to the radially outer casing aperture during a third mode of operation.

In yet another aspect, method of cooling a gas turbine engine is provided. The method includes channeling a first flow of fluid from a compressor bleed port to ambient in a first mode of operation. The method also includes channeling a second flow of fluid from ambient to a cavity in a second mode of operation. The method further includes channeling a third flow of fluid from the cavity to ambient in a third mode of operation.

DRAWINGS

These and other features, aspects, and advantages of the present disclosure will become better understood when the following detailed description is read with reference to the accompanying drawings in which like characters represent like parts throughout the drawings, wherein:

FIGS. 1-4 show example embodiments of the method and apparatus described herein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the undercowl cooling system described herein reduce the temperature of a cavity of a gas turbine engine, for example, the undercowl space of a gas turbine engine. The gas turbine engine includes an inner casing and an outer casing defining a cavity. The inner casing includes an inner casing opening and the outer casing includes an outer casing opening. The undercowl cooling system includes a first conduit extending from the inner casing opening to the outer casing opening. The undercowl cooling system also includes a second conduit extending from the first conduit into the cavity. The first conduit includes a first valve and the second conduit includes a second valve. The undercowl cooling system is configured to channel air into or out of the gas turbine engine during three different operational modes. During the first operational mode, for example, the undercowl cooling system is configured to channel compressor bleed air from the gas turbine engine's core engine into the fan duct. During the second operational mode, for example, the undercowl cooling system is configured to channel cool air from the fan duct into the gas turbine engine's core compartment. The second operational mode mitigates soakback by channeling the cool air in the fan duct into the engine core compartment before the engine has ceased operation. During the third operational mode, for example, the undercowl cooling system is configured to channel hot air from the undercowl space into the fan duct. The third operational mode mitigates soakback by channeling the hot air in the undercowl space into the fan duct after the engine has ceased operation.

The undercowl space cooling system described herein offers advantages over known methods of cooling undercowl spaces in aircraft engines. More specifically, channeling hot air from the undercowl space into the fan duct mitigates soakback by providing an escape path for hot air in the undercowl space. Additionally, channeling fan duct air into the undercowl space cools the undercowl space before the engine ceases operation. Reducing the temperature of the undercowl space before engine shutdown mitigates soakback. Finally, modifying the compressor bleed system to mitigate soakback rather than oversizing the core compartment cooling system to mitigate soakback reduces the weight of the engine and reduces fuel consumption.

Figure 1:
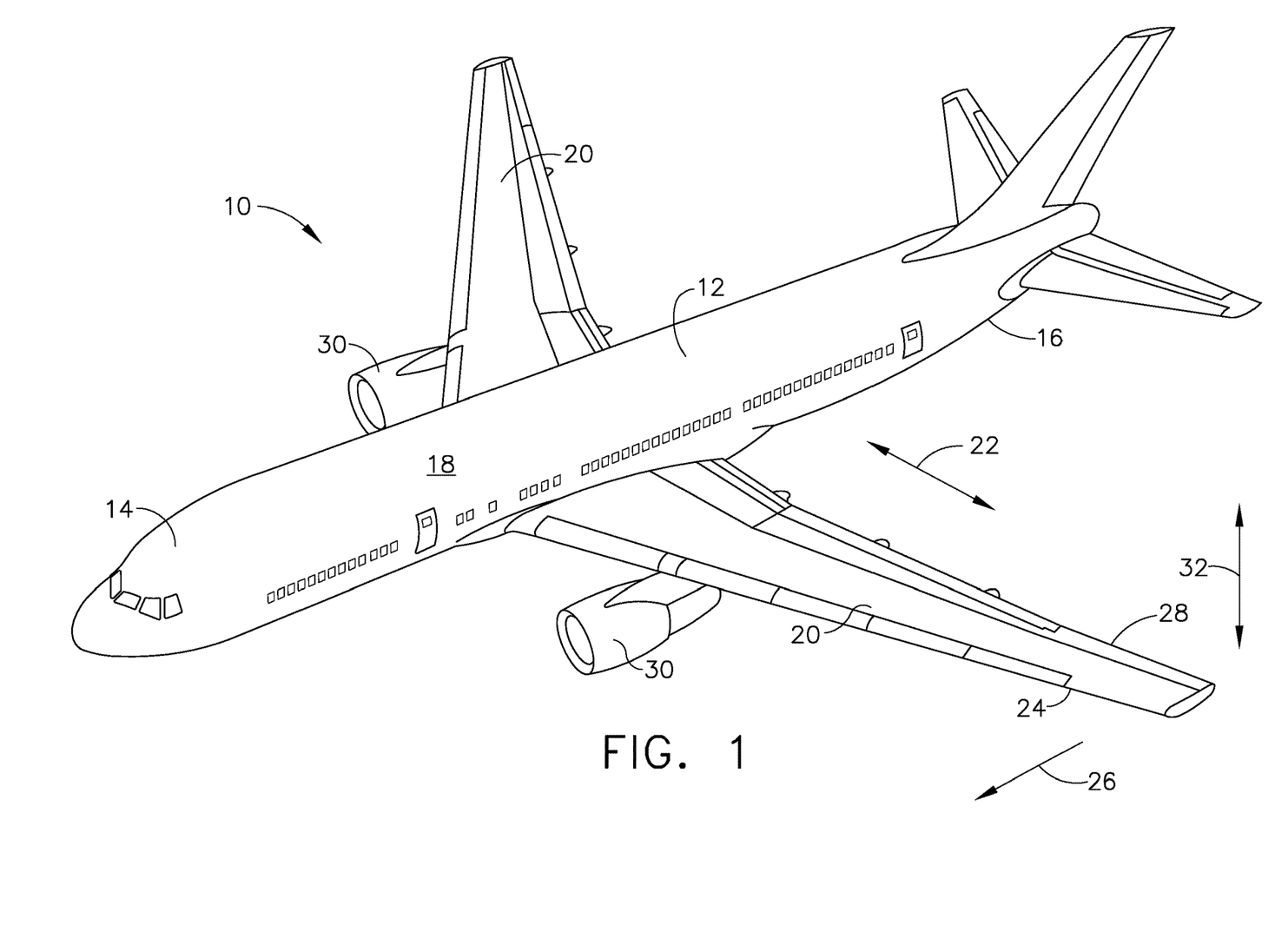
FIG. 1 is a perspective view of an aircraft.

FIG. 1 is a perspective view of an aircraft 10. In the example embodiment, aircraft 10 includes a fuselage 12 that includes a nose 14, a tail 16, and a hollow, elongate body 18 extending therebetween. Aircraft 10 also includes a wing 20 extending away from fuselage 12 in a lateral direction 22. Wing 20 includes a forward leading edge 24 in a direction 26 of motion of aircraft 10 during normal flight and an aft trailing edge 28 on an opposing edge of wing 20. Aircraft 10 further includes at least one engine 30 configured to drive a bladed rotatable member or fan to generate thrust. Engine 30 is coupled to at least one of wing 20 and fuselage 12, for example, in a pusher configuration (not shown) proximate tail 16. In the exemplary embodiment, engine 30 is coupled to wing 20 below wing 20 in a vertical direction 32. Vertical direction 32 is defined relative to the direction aircraft 10 is oriented when stationary on the ground. Down, vertically lower, or below refers to the side of aircraft 10 facing the ground when aircraft 10 has weight on wheels. Up, vertically upper, or above refers to the side of aircraft 10 opposite down, vertically lower, or below. Engine 30 is not limited to wing-mount engines as depicted in FIG. 1. Engine 30 may also include engines installed over wing 20, engines installed to fuselage 12, or engines installed within fuselage 12.

Figure 2:
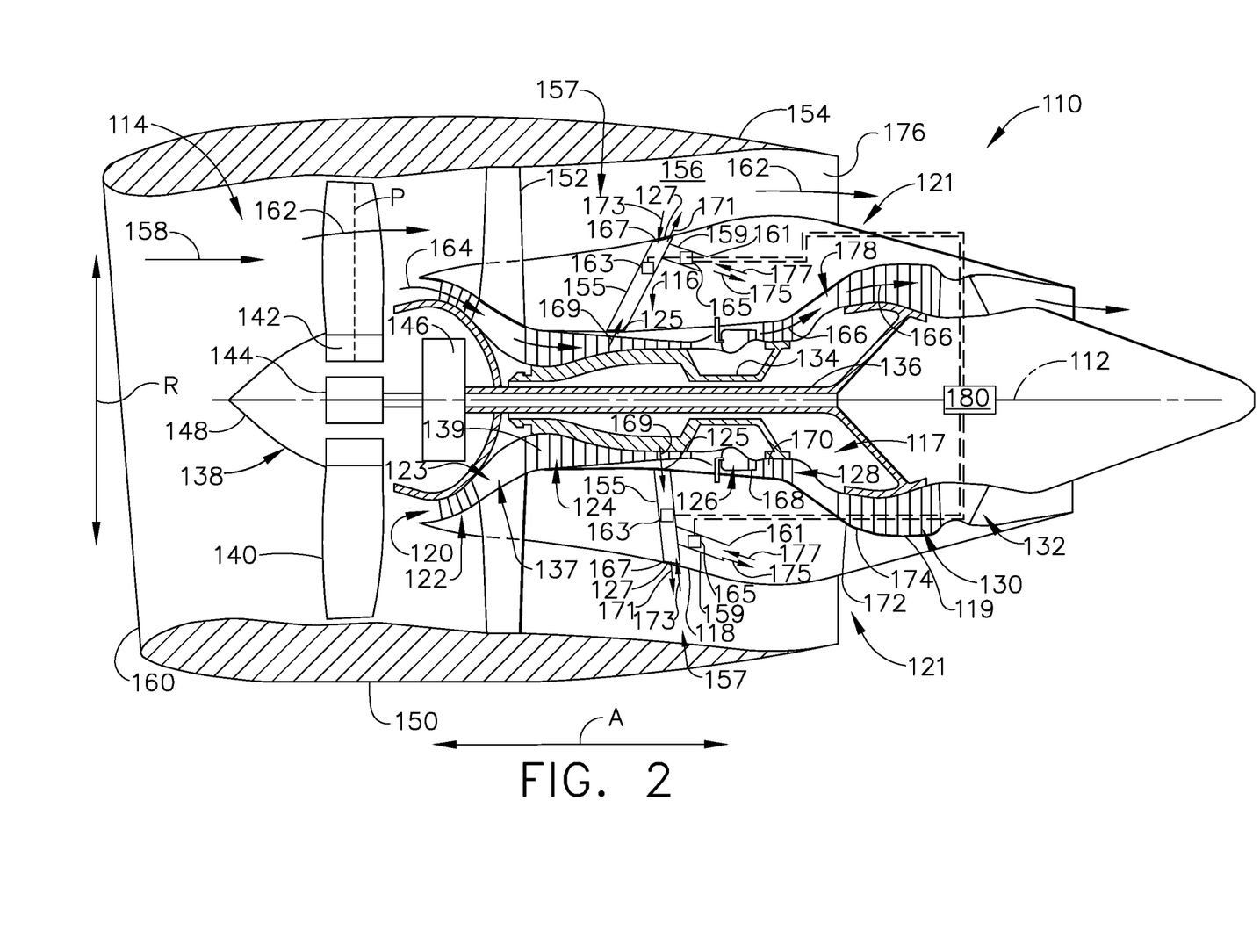
FIG. 2 is a schematic view of a gas turbine engine.
Figure 3:
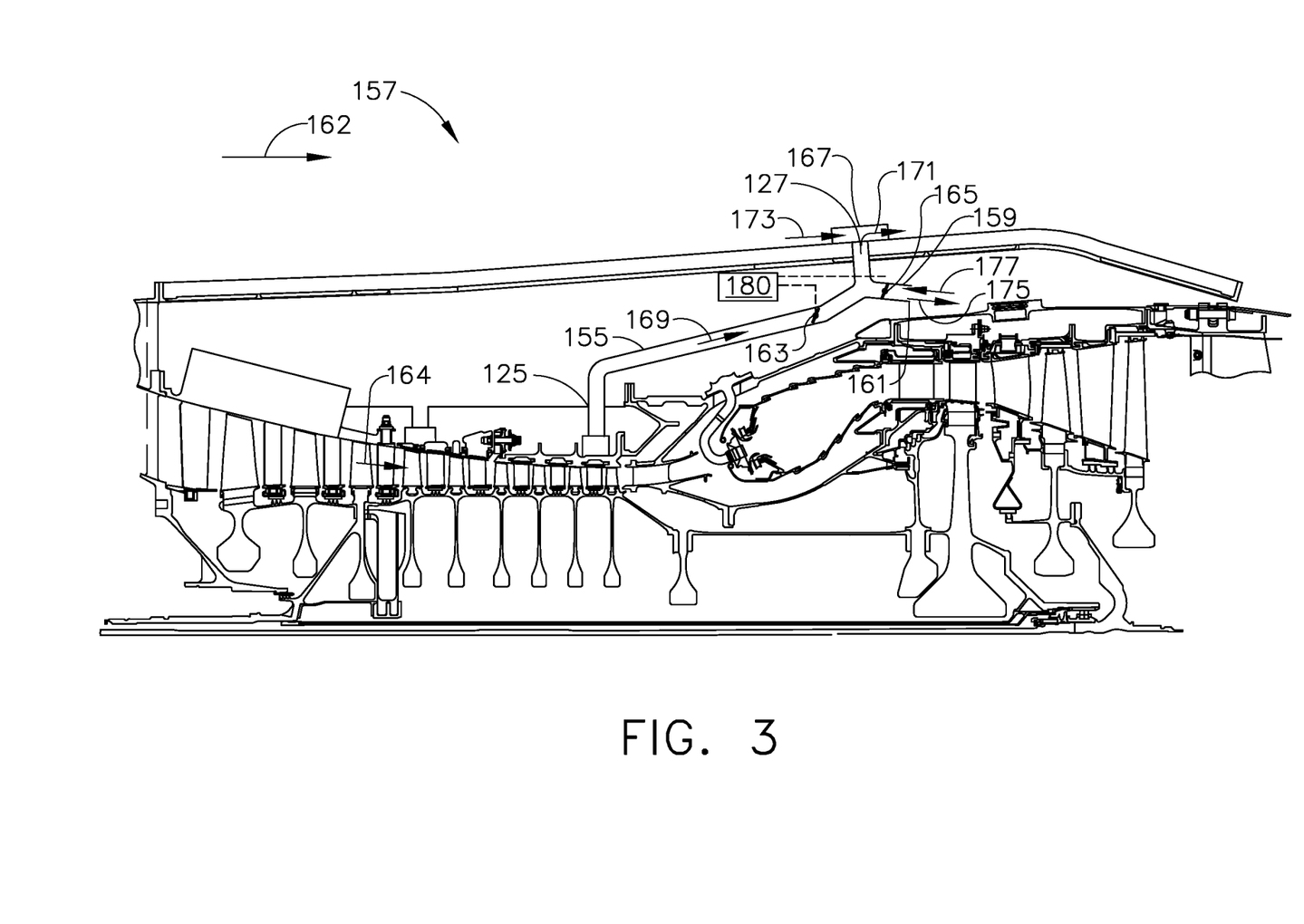
FIG. 3 is a partial schematic view of the gas turbine engine shown in FIG. 2.
Figure 4:
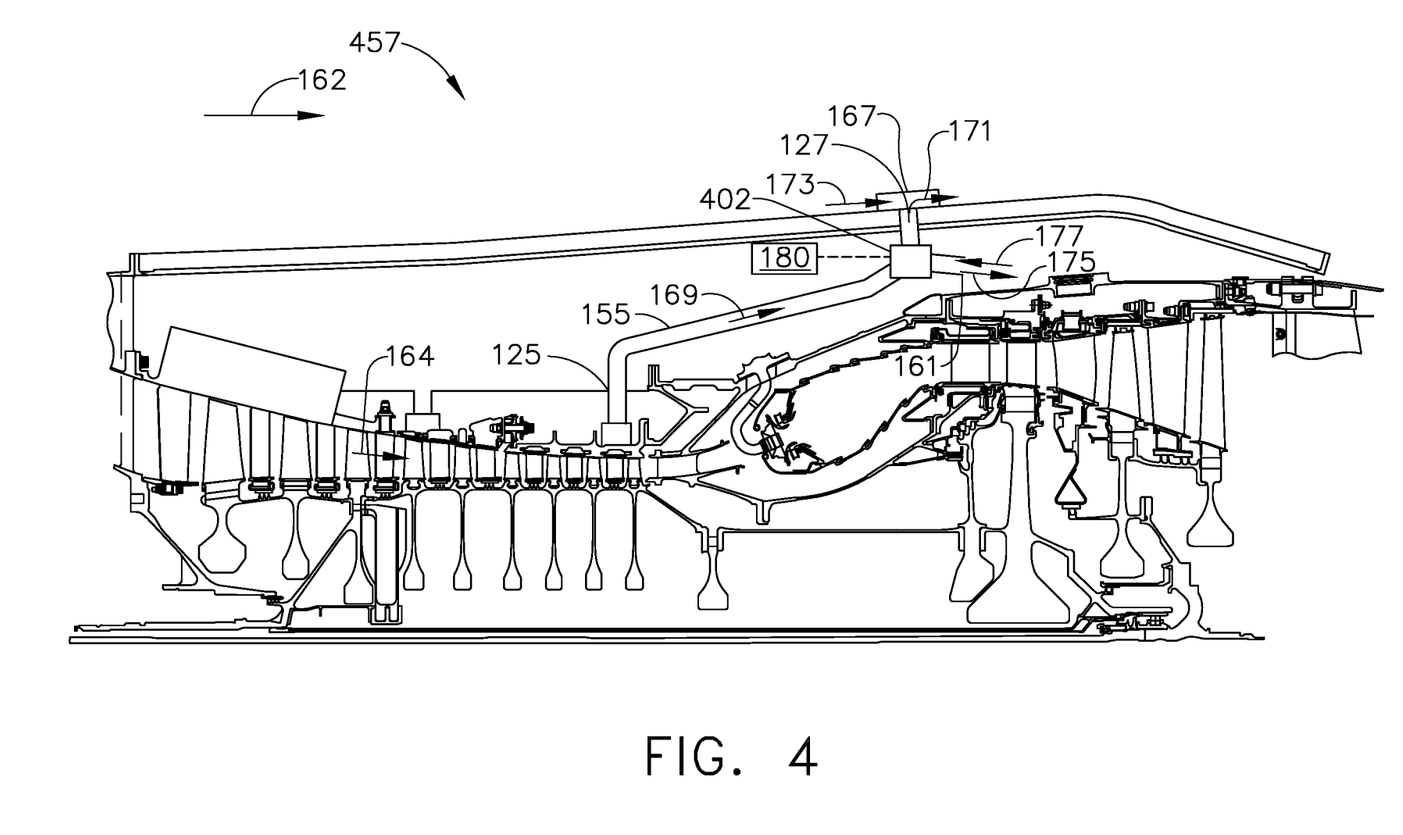
FIG. 4 is a partial schematic view of the gas turbine engine shown in FIG. 2.

FIG. 2 is a schematic cross-sectional view of a gas turbine engine 110 in accordance with an exemplary embodiment of the present disclosure. FIG. 3 is a partial schematic cross-sectional view of gas turbine engine 110 in accordance with an exemplary embodiment of the present disclosure. FIG. 4 is a partial schematic cross-sectional view of gas turbine engine 110 in accordance with an exemplary embodiment of the present disclosure. In the exemplary embodiment, gas turbine engine 110 is a high-bypass turbofan jet engine 110, referred to herein as "turbofan engine 110." Gas turbine engine 110 is not limited to high bypass turbofan engines. As shown in FIG. 2, turbofan engine 110 defines an axial direction A (extending parallel to a longitudinal centerline 112 provided for reference) and a radial direction R. In general, turbofan engine 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 and an inner casing 119 encases, in serial flow relationship, a compressor section 123 including a booster or low pressure (LP) compressor 122 and a high pressure (HP) compressor 124; a combustion section 126; a turbine section 117 including a high pressure (HP) turbine 128 and a low pressure (LP) turbine 130; and a jet exhaust nozzle section 132. The volume between outer casing 118 and inner casing 119 forms a plurality of cavities or undercowl spaces 121. A high pressure (HP) shaft or spool 134 drivingly connects HP turbine 128 to HP compressor 124. A low pressure (LP) shaft or spool 136 drivingly connects LP turbine 130 to LP compressor 122. Compressor section 123, combustion section 126, turbine section 117, and nozzle section 132 together define a core air flowpath 137. HP compressor 124 includes a plurality of HP compressor blades 139 configured to increase the pressure of a flow of air. Inner casing 119 defines a plurality of radially inner casing apertures 125 and outer casing 118 defines a plurality of radially outer casing apertures 127. In the exemplary embodiment, radially inner casing apertures 125 include compressor bleed ports and radially outer casing apertures 127 include transient bleed valves.

As shown in FIG. 2, fan section 114 includes a variable pitch fan 138 having a plurality of fan blades 140 coupled to a disk 142 in a spaced apart manner. As depicted, fan blades 140 extend outwardly from disk 142 generally along radial direction R. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. Fan blades 140, disk 142, and pitch change mechanism 144 are together rotatable about longitudinal axis 112 by LP shaft 136 across a power gear box 146. Power gear box 146 includes a plurality of gears for adjusting the rotational speed of fan 138 relative to LP shaft 136 to a more efficient rotational fan speed. Fan 138 is not limited to a variable pitch fan as depicted in FIG. 2. Fan 138 may also include fixed pitch fans. In another embodiment, gas turbine engine 110 does not include power gear box 146. Rather, fan 138 is coupled directly to LP shaft 136.

Also, in the exemplary embodiment, disk 142 is covered by rotatable front hub 148 aerodynamically contoured to promote an airflow through plurality of fan blades 140. Additionally, exemplary fan section 114 includes an annular fan casing or outer nacelle 150 that circumferentially surrounds fan 138 and/or at least a portion of core turbine engine 116. Nacelle 150 is configured to be supported relative to core turbine engine 116 by a plurality of circumferentially-spaced outlet guide vanes 152. A downstream section 154 of nacelle 150 extends over an outer portion of core turbine engine 116 so as to define a bypass airflow passage 156 therebetween.

FIGS. 3 and 4 are partial schematic views of the gas turbine engine shown in FIG. 2. As shown in FIGS. 2-3, a plurality of undercowl cooling systems 157 are positioned within undercowl spaces 121. In the exemplary embodiment, a first conduit 155 extends from radially inner casing aperture 125 to radially outer casing aperture 127. In the exemplary embodiment, a second conduit 159 extends from first conduit 155 to a second conduit opening 161 within undercowl spaces 121. The intersection of first conduit 155 and second conduit 159 may be a T-fitting or any other fitting which enables undercowl cooling system 157 to operate as described herein. In another embodiment (not shown), second conduit 159 extends from radially outer casing aperture 127 to second conduit opening 161 within undercowl spaces 121. First conduit 155 includes a first valve 163 and second conduit 159 includes a second valve 165. An exhaust silencer or pepper pot 167 covers radially outer casing aperture 127. Pepper pot 167 includes a screen (not shown) which is configured to muffle noise and allow air to pass through the screen. As shown in FIG. 4, a plurality of undercowl cooling systems 457 include a third valve 402 positioned at the intersection of first conduit 155 and second conduit 159 rather than first valve 163 and second valve 165. In the exemplary embodiment, third valve 402 includes a three-way valve. In the exemplary embodiment, a controller 180 controls first valve 163, second valve 165, and third valve 402.

During a first mode of operation of turbofan engine 110, a volume of air 158 enters turbofan engine 110 through an associated inlet 160 of nacelle 150 and/or fan section 114. As volume of air 158 passes across fan blades 140, a first portion of air 158 as indicated by arrows 162 is directed or routed into bypass airflow passage 156 and a second portion of air 158 as indicated by arrow 164 is directed or routed into core air flowpath 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

A third portion of air 169 as indicated by arrow 169 is directed or routed into radially inner casing aperture 125 and first conduit 155. First valve 163 is configured in an open position and second valve 165 is configured in a closed position. Third portion of air 169 is routed or directed through radially outer casing aperture 127 and pepper pot 167, and into bypass airflow passage 156 as indicated by arrow 171. Channeling HP compressor 124 air (third portion of air 169) into bypass airflow passage 156 improves the efficiency of HP compressor 124 and gas turbine engine 110 during certain modes of operation. Undercowl cooling system 457 shown in FIG. 4 includes the same operational steps as undercowl cooling system 157 except third valve 402 routes third portion of air 169 through first conduit 155 and away from second conduit 159.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, thus causing LP shaft or spool 136 to rotate, thereby supporting operation of LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

During a second mode of operation of turbofan engine 110, such as when aircraft 10 is descending or has landed, a fourth portion of air 173 as indicated by arrow 173 is directed or routed from bypass airflow passage 156 through radially outer casing aperture 127 and pepper pot 167, and into first conduit 155. First valve 163 is configured in a closed position and second valve 165 is configured in an open position. Fourth portion of air 173 is routed or directed through second conduit 159 and second conduit opening 161, and into undercowl spaces 121 as indicated by arrow 175. The temperature of portion of air 162 from bypass airflow passage 156 is lower than the temperature of air within undercowl spaces 121, which cools undercowl spaces 121 before turbofan engine 110 has ceased operation. Reducing the temperature of undercowl spaces 121 before turbofan engine 110 has ceased operation mitigates the effects of soakback by reducing the temperature of undercowl spaces 121 before soakback begins and reducing the peak temperature of undercowl spaces 121 during soakback. Undercowl cooling system 457 shown in FIG. 4 includes the same operational steps as undercowl cooling system 157 except third valve 402 routes fourth portion of air 173 from first conduit 155 into second conduit 159.

During a third mode of operation of turbofan engine 110, such as when aircraft 10 has ceased operation, a fifth portion of air 177 as indicated by arrow 177 is directed or routed from undercowl spaces 121 through second conduit 159 and second conduit opening 161, and into first conduit 155. First valve 163 is configured in a closed position and second valve 165 is configured in an open position. Fifth portion of air 177 is routed or directed through radially outer casing aperture 127 and pepper pot 167, and into bypass airflow passage 156 as indicated by arrow 171. Soakback increases the temperature of air within undercowl spaces 121 after turbofan engine 110 has ceased operation. Third mode of operation provides an escape route for hot air within undercowl spaces 121 to escape through first and second conduits 155 and 159. Allowing the hot air within undercowl spaces 121 to escape reduces the temperature within undercowl spaces 121 and mitigates the effects of soakback. Undercowl cooling system 457 shown in FIG. 4 includes the same operational steps as undercowl cooling system 157 except third valve 402 routes fifth portion of air 177 from second conduit 159 into first conduit 155.

In the exemplary embodiment, turbofan engine 110 includes two undercowl cooling systems 157. One undercowl cooling system 157 is positioned on the vertically upper portion of turbofan engine 110 and the other undercowl cooling system 157 is positioned on the vertically lower portion of turbofan engine 110. During the third mode of operation, the undercowl cooling system 157 positioned on the vertically upper portion of turbofan engine 110 may allow more hot air to escape from undercowl cooling system 157 because hot air raises. The undercowl cooling system 157 positioned on the vertically lower portion of turbofan engine 110 may allow more bypass airflow passage 156 air to enter undercowl spaces 121. However, turbofan engine 110 is not limited to two undercowl cooling systems 157 and may include any number of undercowl cooling systems 157 which enable turbofan engine 110 to operate as described herein. Additionally, undercowl cooling systems 157 are not limited to the vertically upper and vertically lower portions of turbofan engine 110. Rather undercowl cooling systems 157 may be positioned in any position around the circumference of turbofan engine 110 which enables turbofan engine to operate as described herein.

Undercowl cooling systems 157 and 457 reduce the weight of gas turbine engine 110 by providing a light-weight system to reduce the effects of soakback. Rather than oversize an existing system, such as the core compartment cooling system, to mitigate the effects of soakback, undercowl cooling systems 157 and 457 provide a light-weight system for mitigating the effects of soakback.

Exemplary turbofan engine 110 depicted in FIG. 2 is by way of example only, and that in other embodiments, turbofan engine 110 may have any other suitable configuration. It should also be appreciated, that in still other embodiments, aspects of the present disclosure may be incorporated into any other suitable gas turbine engine. For example, in other embodiments, aspects of the present disclosure may be incorporated into, e.g., a turboprop engine.

The above-described undercowl cooling system provides an efficient method for cooling an undercowl space in a gas turbine engine. Specifically, delivering bypass airflow passage air directly to the undercowl space before the gas turbine engine has ceased operation reduces the temperature in the undercowl space and mitigates the effects of soakback. Additionally, channeling undercowl space air out of the undercowl space after the engine has ceased operation reduces the temperature in the undercowl space and mitigates the effects of soakback. Finally, including multiple undercowl cooling systems provides an escape route for hot air within the undercowl space and a source of cooling air from the bypass airflow passageway to cool the undercowl space and mitigate the effects of soakback.

An exemplary technical effect of the methods, systems, and apparatus described herein includes at least one of: (a) decreasing the temperature within the undercowl spaces before the gas turbine engine ceases operation; (b) decreasing the temperature within the undercowl spaces after the gas turbine engine ceases operation; (c) decreasing the weight of a gas turbine engine; and (d) decreasing the weight of an aircraft.

Exemplary embodiments of the undercowl cooling system are described above in detail. The undercowl cooling system, and methods of operating such units and devices are not limited to the specific embodiments described herein, but rather, components of systems and/or steps of the methods may be utilized independently and separately from other components and/or steps described herein. For example, the methods may also be used in combination with other systems for cooling undercowl spaces, and are not limited to practice with only the systems and methods as described herein. Rather, the exemplary embodiment may be implemented and utilized in connection with many other machinery applications that require undercowl space cooling.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas turbine engine comprising:
   a core engine comprising a compressor, a combustor, and a turbine in a serial flow arrangement;
   an upper portion of said gas turbine engine;
   a lower portion of said gas turbine engine opposite said upper portion of said gas turbine engine;
   an inner casing wall circumscribing said core engine, said inner casing wall defining a plurality of inner casing apertures;

an outer casing wall circumscribing said inner casing wall, said inner casing wall and said outer casing wall defining at least one cavity therebetween, said at least one cavity extends from the outer casing wall to said inner casing wall, said outer casing wall defining a plurality of outer casing apertures; and at least one cooling system comprising:
a first conduit extending between a first inner casing aperture of said plurality of inner casing apertures and a first outer casing aperture of said plurality of outer casing apertures;
a second conduit having an end coupled in flow communication to said first conduit and a second conduit exit disposed within said at least one cavity and positioned facilitate cooling of said at least one cavity;
a first valve operatively coupled to control a first flow of fluid through said first conduit; and
a second valve operatively coupled to control at least one of a second flow of fluid or a third flow of fluid through said second conduit and between said first outer casing aperture and said at least one cavity;
wherein during a first mode of operation said first conduit channels the first flow of fluid from said first inner casing aperture to said first outer casing aperture, during a second mode of operation a portion of said first conduit and said second conduit channel the second fluid from said first outer casing aperture to said at least one cavity, during a third mode of operation said portion of said first conduit and said second conduit channel said third flow of fluid from said at least one cavity to said first outer casing aperture.

2. The gas turbine engine of claim 1, wherein said at least one cooling system comprises a first cooling system and a second cooling system.

3. The gas turbine engine of claim 2, wherein said first cooling system is operatively coupled with said upper portion of said gas turbine engine.

4. The gas turbine engine of claim 2, wherein said second cooling system is operatively coupled with said lower portion of said gas turbine engine.

5. The gas turbine engine of claim 1, wherein during said first mode of operation said first valve is in an open position and said second valve is in a closed position.

6. The gas turbine engine of claim 1, wherein during said second mode of operation said first valve is in a closed position and said second valve is in an open position.

7. The gas turbine engine of claim 1, wherein during said third mode of operation said first valve is in a closed position and said second valve is in an open position.

8. The gas turbine engine of claim 1, wherein the second mode comprises an aircraft in one of a descent configuration or a taxi configuration following a landing.

9. The gas turbine engine of claim 1, wherein the third mode comprises an aircraft which has ceased operation.

10. The gas turbine engine of claim 1, wherein said portion of said first conduit and said second conduit define an escape route for hot air within said cavity when in said third mode of operation, wherein allowing the hot air within the cavity to escape reduces a temperature within the cavity and mitigates an effect of soakback.

11. A method of cooling a gas turbine engine, the method comprising:
a core engine of said gas turbine engine comprising a compressor, a combustor, and a turbine in a serial flow arrangement;
an upper portion of said gas turbine engine;
a lower portion of said gas turbine engine opposite said upper portion of said gas turbine engine;

an inner casing wall circumscribing said core engine, said inner casing wall defining a plurality of inner casing apertures;
an outer casing wall circumscribing said inner casing wall, said inner casing wall and said outer casing wall defining at least one cavity therebetween, said at least one cavity extends from the outer casing wall to said inner casing wall, said outer casing wall defining a plurality of outer casing apertures; and at least one cooling system comprising:
a first conduit extending between a first inner casing aperture of said plurality of inner casing apertures and a first outer casing aperture of said plurality of outer casing apertures;
a second conduit having an end coupled in flow communication to said first conduit and a second conduit exit disposed within said at least one cavity and positioned facilitate cooling of said at least one cavity;
a first valve operatively coupled to control a first flow of fluid through said first conduit; and
a second valve operatively coupled to control at least one of a second flow of fluid or a third flow of fluid through said second conduit and between said first outer casing aperture and said at least one cavity;
the method further comprising:
in a first mode of operation, said first conduit channeling a first flow of fluid from a compressor bleed port to ambient;
in a second mode of operation, said first conduit and said second conduit channeling a second flow of fluid from ambient to said at least one cavity; and
in a third mode of operation, said portion of said first conduit and said second conduit channeling a third flow of fluid from the at least one cavity to ambient.

12. The method of claim 11 further comprising controlling the first flow of fluid with the first valve.

13. The method of claim 11 further comprising controlling the second flow of fluid with the second valve.

14. A gas turbine engine comprising:
a core engine comprising a compressor, a combustor, and a turbine in a serial flow arrangement;
an upper portion of said gas turbine engine;
a lower portion of said gas turbine engine opposite said upper portion of said gas turbine engine;
an inner casing wall circumscribing said core engine, said inner casing wall defining a plurality of inner casing apertures;
an outer casing wall circumscribing said inner casing wall, said inner casing wall and said outer casing wall defining at least one cavity therebetween, said at least one cavity extends from the outer casing wall to said inner casing wall, said outer casing wall defining a plurality of outer casing apertures; and at least one cooling system comprising:
a first conduit extending between a first inner casing aperture of said plurality of inner casing apertures and a first outer casing aperture of said plurality of outer casing apertures;
a second conduit having an end coupled in flow communication to said first conduit and a second conduit opening disposed within said at least one cavity;
a three-way valve coupled in flow communication with said first conduit and said second conduit; and
wherein during a first mode of operation said three-way valve permits said first conduit to channel the first flow of fluid from said first inner casing aperture to said first outer casing aperture, during a second mode of operation said three-way valve permits said second conduit to channel the second fluid from said first outer casing aperture to said at least one cavity, during a third mode of operation said three-way valve permits a portion of said first conduit and said second conduit to channel said third flow of fluid from said at least one cavity to said first outer casing aperture.

15. The gas turbine engine of claim 14, wherein the second mode comprises an aircraft in one of a descent configuration or a taxi configuration following a landing.

16. The gas turbine engine of claim 14, wherein the third mode comprises an aircraft which has ceased operation.

17. The gas turbine engine of claim 14, wherein said portion of said first conduit and said second conduit define an escape route for hot air within said cavity when in said third mode of operation, wherein allowing the hot air within the cavity to escape reduces a temperature within the cavity and mitigates an effect of soakback.

* * * * *